(12) United States Patent
Sato et al.

(10) Patent No.: US 12,264,252 B2
(45) Date of Patent: Apr. 1, 2025

(54) INK SET, PRINTED WORK, AND IMAGE FORMATION METHOD

(71) Applicant: SAKATA INX CORPORATION, Osaka (JP)

(72) Inventors: Yoichi Sato, Osaka (JP); Kazuki Moriyasu, Osaka (JP); Eri Ueda, Osaka (JP); Takaaki Sano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 545 days.

(21) Appl. No.: 17/310,210

(22) PCT Filed: Jan. 17, 2020

(86) PCT No.: PCT/JP2020/001518
§ 371 (c)(1),
(2) Date: Jul. 26, 2021

(87) PCT Pub. No.: WO2020/213220
PCT Pub. Date: Oct. 22, 2020

(65) Prior Publication Data
US 2022/0056294 A1   Feb. 24, 2022

(30) Foreign Application Priority Data
Apr. 19, 2019   (JP) .................... 2019-080044

(51) Int. Cl.
| | | |
|---|---|---|
| *C09D 11/40* | (2014.01) | |
| *B41M 5/00* | (2006.01) | |
| *C09D 11/023* | (2014.01) | |
| *C09D 11/033* | (2014.01) | |
| *C09D 11/037* | (2014.01) | |
| *C09D 11/102* | (2014.01) | |
| *C09D 11/108* | (2014.01) | |
| *C09D 11/322* | (2014.01) | |
| *C09D 11/38* | (2014.01) | |
| *C09D 11/54* | (2014.01) | |

(52) U.S. Cl.
CPC ........... *C09D 11/40* (2013.01); *B41M 5/0023* (2013.01); *C09D 11/023* (2013.01); *C09D 11/033* (2013.01); *C09D 11/037* (2013.01); *C09D 11/102* (2013.01); *C09D 11/108* (2013.01); *C09D 11/322* (2013.01); *C09D 11/38* (2013.01); *C09D 11/54* (2013.01)

(58) Field of Classification Search
CPC ... C09D 11/023; C09D 11/033; C09D 11/102; C09D 11/106; C09D 11/108; C09D 11/30; C09D 11/322; C09D 11/36; C09D 11/38; C09D 11/40
See application file for complete search history.

(56) References Cited

U.S. PATENT DOCUMENTS

| | | | |
|---|---|---|---|
| 2007/0225400 A1* | 9/2007 | Schmid | .................. C09D 11/30 523/160 |
| 2011/0318551 A1 | 12/2011 | Nakagawa | |
| 2012/0098883 A1 | 4/2012 | Matsuyama et al. | |
| 2020/0239721 A1 | 7/2020 | Sato et al. | |

FOREIGN PATENT DOCUMENTS

| | | | |
|---|---|---|---|
| JP | 2009-190379 A | 8/2009 | |
| JP | 2011-026564 A | 2/2011 | |
| JP | 2013-194122 | 9/2013 | |
| JP | 2016-003287 A | 1/2016 | |
| JP | 2017-088646 A | 5/2017 | |
| JP | 6424266 B | 10/2018 | |
| JP | WO 2019/078136 A1 * | 11/2018 | ................ B41J 2/01 |

OTHER PUBLICATIONS

Search Report in International Application No. PCT/JP2020/001518 mailed on Mar. 10, 2020.
Office Action received in Indian Patent Application No. 202147050503, mailed Feb. 3, 2023.
International Preliminary Report on Patentability in International Application No. PCT/JP2020/001512 issued on Sep. 28, 2021.
Written Opinion of the International Searching Authority in International Application No. PCT/JP2020/001512 mailed on Mar. 31, 2020.

* cited by examiner

*Primary Examiner* — Ana L. Woodward
(74) *Attorney, Agent, or Firm* — KNOBBE, MARTENS, OLSON & BEAR LLP

(57) ABSTRACT

An ink set including an aqueous inkjet ink composition and a primer composition. The aqueous inkjet ink composition contains a pigment, an alkali-soluble resin, a resin emulsion, a surfactant, a water-soluble solvent, and water; the resin emulsion contains a polyurethane resin emulsion and/or a polyolefin resin emulsion; the surfactant contains an alkyl sulfonate and/or a polyoxyethylene alkyl ether sulfate; the aqueous inkjet ink composition has a content of the alkyl sulfonate and/or the polyoxyethylene alkyl ether sulfate of 0.05% by mass or more and 0.5% by mass or less; and the primer composition contains an aggregation accelerator that accelerates aggregation of the aqueous inkjet ink composition. The ink set provides a printed matter having good print image quality and excellent abrasion resistance, and has good storage stability and ejection stability.

4 Claims, No Drawings

INK SET, PRINTED WORK, AND IMAGE FORMATION METHOD

This application is the U.S. National Phase under 35 U.S.C. § 371 of International Application PCT/JP2020/001518, filed Jan. 17, 2020, designating the U.S., and published in Japanese as WO 2020/213220 on Oct. 22, 2020, which claims priority to Japanese Patent Application No. 2019-080044, filed Apr. 19, 2019, the entire content of which is incorporated herein by reference.

TECHNICAL FIELD

The present invention relates to an ink set, a printed matter, and an image formation method.

BACKGROUND ART

It is known an ink set including an aqueous inkjet ink composition containing a pigment, an alkali-soluble resin, a resin emulsion, a surfactant, a water-soluble solvent, and water; and a primer composition containing an aggregation accelerator that accelerates aggregation of the aqueous inkjet ink composition (Patent Documents 1 to 3). These Patent Documents disclose that their ink sets have good storage stability and ejection stability, and the printed matter obtained by performing printing using the ink sets has good print image quality.

PRIOR ART DOCUMENTS

Patent Documents

Patent Document 1: JP-A-2009-190379
Patent Document 2: JP-6424266
Patent Document 3: JP-A-2017-88646

SUMMARY OF THE INVENTION

Problems to be Solved by the Invention

Meanwhile, a printed matter obtained by performing printing using the ink sets as described above is required to have abrasion resistance so that smearing or image deletion will not occur when a printed part (a print part, an image part and the like) is rubbed, and the printed matter disclosed in Patent Documents as described above has room for improvement in such abrasion resistance.

The present invention has been made in view of the above circumstances, and an object of the present invention is to provide an ink set that provides a printed matter having good print image quality and excellent abrasion resistance, and has good storage stability and ejection stability.

Means for Solving the Problems

That is, the present invention relates to an ink set including: an aqueous inkjet ink composition; and a primer composition, wherein the aqueous inkjet ink composition contains a pigment, an alkali-soluble resin, a resin emulsion, a surfactant, a water-soluble solvent, and water, the resin emulsion contains a polyurethane resin emulsion and/or a polyolefin resin emulsion, the surfactant contains an alkyl sulfonate and/or a polyoxyethylene alkyl ether sulfate, the aqueous inkjet ink composition has a content of the alkyl sulfonate and/or the polyoxyethylene alkyl ether sulfate of 0.05% by mass or more and 0.5% by mass or less, and the primer composition contains an aggregation accelerator that accelerates aggregation of the aqueous inkjet ink composition.

The present invention also relates to a printed matter obtained by performing printing using the ink set.

The present invention also relates to an image formation method in which the ink set is used.

Effect of the Invention

Though the details of the mechanism of action of the effect in the ink set of the present invention are partially unknown, they are presumed as follows. However, the interpretation of the present invention does not have to be limited to this mechanism of action.

The ink set of the present invention includes an aqueous inkjet ink composition; and a primer composition, the aqueous inkjet ink composition contains a pigment, an alkali-soluble resin, a resin emulsion, a surfactant, a water-soluble solvent, and water, the resin emulsion contains a polyurethane resin emulsion and/or a polyolefin resin emulsion, the surfactant contains a specific amount of an alkyl sulfonate and/or a polyoxyethylene alkyl ether sulfate, and the primer composition contains an aggregation accelerator that accelerates aggregation of the aqueous inkjet ink composition. In the aqueous inkjet ink composition, a polyurethane resin emulsion and/or a polyolefin resin emulsion are used to form a print coating film excellent in abrasion resistance, and a specific amount of alkyl sulfonate and/or polyoxyethylene alkyl ether sulfate is used to achieve excellent leveling property on the primer even when an ink composition to which a resin emulsion is added is used. Thus, the ink set of the present invention provides a printed matter having good print image quality and excellent abrasion resistance, and has good storage stability and ejection stability.

MODE FOR CARRYING OUT THE INVENTION

The ink set of the present invention includes an aqueous inkjet ink composition and a primer composition.
<Aqueous Inkjet Ink Composition>
The aqueous inkjet ink composition of the present invention contains a pigment, an alkali-soluble resin, a resin emulsion, a surfactant, a water-soluble solvent, and water.
<Pigment>
As the pigment of the present invention, an organic pigment or an inorganic pigment used in an ink composition for ink jet printing can be used without particular limitation. Examples of the organic pigment include dye lake pigments, azo pigments, benzimidazolone pigments, phthalocyanine pigments, quinacridone pigments, anthraquinone pigments, dioxazine pigments, indigo pigments, thioindico pigments, perylene pigments, perinone pigments, diketopyrrolopyrrole pigments, isoindolinone pigments, nitro pigments, nitroso pigments, anthraquinone pigments, flavanthrone pigments, quinophthalone pigments, pyranthrone pigments, and indanthrone pigments. Examples of the inorganic pigment include carbon black, titanium oxide, zinc oxide, red iron oxide, graphite, black iron oxide, chrome oxide green, and aluminum hydroxide. The pigment can be surface-treated with a known surface treatment agent. The pigment can be used singly or in combination of two or more types.

Specific examples of the pigment based on typical hues include the following.

Examples of yellow pigments include C.I. Pigment Yellows 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, and 213.

Examples of magenta pigments include C.I. Pigment Reds 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, and 270, and C.I. Pigment Violet 19.

Examples of cyan pigments include C.I. Pigment Blues 1, 2, 3, 15, 15:1, 15:2, 15:3, 15:4, 15:6, 16, 18, 22, 27, 29, and 60.

Examples of black pigments include carbon black (C.I. Pigment Black 7).

Examples of white pigments include titanium oxide and aluminum oxide, and the white pigments can be surface-treated with various materials such as alumina and silica.

<Alkali-Soluble Resin>

The alkali-soluble resin of the present invention is an ordinary alkali-soluble resin that can be used for pigment dispersion of inks and paints or as a binder, is not particularly limited as long as the alkali-soluble resin can be dissolved in an aqueous medium in the presence of a basic compound, and is preferably a resin containing one type or two or more types of anionic groups such as a carboxyl group, a sulfonic group, and a phosphonic acid group ($-P(=O)(OH_2)$).

The alkali-soluble resin preferably further has a hydrophobic moiety for improving the adsorption mainly on the pigment in the molecule. Examples of the hydrophobic moiety introduced into the molecule include hydrophobic groups such as a long-chain alkyl group and an alicyclic or aromatic cyclic hydrocarbon group.

The acid value of the alkali-soluble resin is preferably 40 mgKOH/g or more, and more preferably 70 mgKOH/g or more from the viewpoint of increasing the solubility in an aqueous medium. The acid value of the alkali-soluble resin is preferably 300 mgKOH/g or less, and more preferably 250 mgKOH/g or less from the viewpoint of improving the water resistance of a printed matter. The acid value is a theoretical acid value of the mg number of potassium hydroxide theoretically required to neutralize 1 g of the alkali-soluble resin arithmetically determined based on the composition of the monomer used for synthesizing the alkali-soluble resin.

The glass transition temperature of the alkali-soluble resin is preferably 0° C. or more, and more preferably 10° C. or more from the viewpoint of improving the blocking resistance of a printed matter. The glass transition temperature of the alkali-soluble resin is preferably 100° C. or less, and more preferably 80° C. or less from the viewpoint of improving the folding resistance of a printed matter.

The glass transition temperature of the alkali-soluble resin is a theoretical glass transition temperature determined by the following wood formula when the alkali-soluble resin is an acrylic copolymer resin.

$$1/Tg = W1/Tg1 + W2/Tg2 + W3/Tg3 + \ldots + Wx/Tgx \quad \text{Wood formula:}$$

[In the formula, $Tg1$ to $Tgx$ represent the glass transition temperature of each homopolymer of the monomers 1, 2, 3 ... x that constitute the alkali-soluble resin, $W1$ to $Wx$ represent each polymerization fraction of monomers 1, 2, 3 ... x, and $Tg$ represents the theoretical glass transition temperature. The glass transition temperature in the wood formula is an absolute temperature.]

The glass transition temperature of the alkali-soluble resin is a theoretical glass transition temperature determined by thermal analysis when the alkali-soluble resin is other than acrylic copolymer resins. For the method of thermal analysis, the glass transition temperature can be measured according to JIS K7121 (Testing Methods for Transition Temperatures of Plastics), as an example, using Pyris1 DSC manufactured by PerkinElmer Co., Ltd. under the conditions of a rate of temperature rise of 20° C./min and a nitrogen gas flow rate of 20 ml/min.

The weight average molecular weight of the alkali-soluble resin is preferably 5,000 or more, and more preferably 10,000 or more from the viewpoint of improving the water resistance of a printed matter. The weight average molecular weight of the alkali-soluble resin is preferably 100,000 or less and more preferably 50,000 or less from the viewpoint of increasing the solubility in an aqueous medium.

The weight average molecular weight can be measured by gel permeation chromatography (GPC) method. As an example, chromatography is performed using Water 2690 (manufactured by Waters Corporation) as a GPC instrument, and PLgel, 5μ, and MIXED-D (manufactured by Polymer Laboratories) as a column under the conditions of a tetrahydrofuran as a developing solvent, a column temperature of 25° C., a flow rate of 1 ml/min, an RI detector, a sample injection concentration of 10 milligrams/milliliter, and an injection amount of 100 microliters, and the weight average molecular weight can be determined in terms of polystyrene.

Examples of the alkali-soluble resin include acrylic copolymer resins, maleic acid copolymer resins, polyester resins obtained by a condensation polymerization reaction, and polyurethane resins. Materials for synthesizing such alkali-soluble resins are disclosed, for example, in JP-A-2000-94825, and acrylic copolymer resins, maleic acid copolymer resins, polyester resins, polyurethane resins and the like that are obtained using the materials described in the publication can be used. Further, resins obtained using other materials other than these materials can also be used. The alkali-soluble resin can be used singly or in combination of two or more types.

As the acrylic copolymer resin, for example, one obtained by polymerizing a mixture of other monomers copolymerizable with an anionic group-containing monomer in a solvent in the presence of an ordinary radical generator (for example, benzoyl peroxide, tertiary butyl peroxybenzoate, azobisisobutyronitrile and the like) can be used.

Examples of the anionic group-containing monomer include monomers having at least one type of anionic group selected from the group consisting of a carboxyl group, a sulfonic group, and a phosphonic acid group, and among these, monomers having a carboxyl group are particularly preferable.

Examples of the monomers having a carboxyl group include acrylic acid, methacrylic acid, crotonic acid, itaconic acid, maleic acid, fumaric acid, 2-carboxyethyl (meth)acrylate, 2-carboxypropyl (meth)acrylate, maleic anhydride, fumaric anhydride, and maleic acid half ester. Examples of the monomers having a sulfonic group include sulfoethyl methacrylate. Examples of the monomers having a phosphonic acid group include phosphonoethyl methacrylate.

The other monomers copolymerizable with an anionic group-containing monomer described above preferably include a hydrophobic group-containing monomer from the viewpoint of improving the adsorption on the pigment.

Examples of the hydrophobic group-containing monomer include, as a monomer having a long-chain alkyl group, alkyl esters having 8 or more carbon atoms of a radically polymerizable unsaturated carboxylic acid such as (meth)acrylic acid (for example, 2-ethylhexyl (meth)acrylate, octyl (meth)acrylate, lauryl (meth)acrylate, stearyl (meth)acrylate, 2-hydroxystearyl (meth)acrylate and the like), alkyl vinyl ethers having 8 or more carbon atoms (for example, dodecyl vinyl ether and the like), and vinyl esters of a fatty acid having 8 or more carbon atoms (for example, vinyl 2-ethylhexanoate, vinyl laurate, vinyl stearate and the like); as a monomer having an alicyclic hydrocarbon group, cyclohexyl (meth)acrylate; and as a monomer having an aromatic hydrocarbon group, styrene monomers such as benzyl (meth)acrylate, styrene, α-methylstyrene, and vinyltoluene. The hydrophobic group-containing monomer can be used singly or in combination of two or more types.

The other monomers copolymerizable with an anionic group-containing monomer described above can include a hydrophilic group-containing monomer from the viewpoint of suppressing aggregation of the alkali-soluble resin in an aqueous medium.

Examples of the hydrophilic group-containing monomer include, as a monomer having a (poly)oxyalkylene chain, esterified products of a (poly)alkylene glycol in which one terminal is capped with alkyl such as methoxy polyethylene glycol, methoxy polyethylene polypropylene glycol, ethoxy polyethylene glycol, ethoxy polyethylene polypropylene glycol, propoxy polyethylene glycol, and propoxy polyethylene polypropylene glycol, and a radically polymerizable unsaturated carboxylic acid such as (meth)acrylic acid, and ethylene oxide adducts and/or propylene oxide adducts of a radically polymerizable unsaturated carboxylic acid such as (meth)acrylic acid; as a basic group-containing monomer, vinylpyrrolidones such as 1-vinyl-2-pyrrolidone and 1-vinyl-3-pyrrolidone, vinylpyridines such as 2-vinylpyridine, 4-vinylpyridine, 5-methyl-2-vinylpyridine, and 5-ethyl-2-vinylpyridine, vinyl imidazoles such as 1-vinyl imidazole and 1-vinyl-2-methylimidazole, vinylpiperidines such as 3-vinylpiperidine and N-methyl-3-vinylpiperidine, nitrogen-containing derivatives of (meth)acrylic acid such as dimethylaminoethyl (meth)acrylate, diethylaminoethyl (meth)acrylate, tertiary-butylaminoethyl (meth)acrylate, (meth)acrylamide, N-methylol (meth)acrylamide, N-butoxymethyl (meth)acrylamide, N-methoxy (meth)acrylamide, N-ethoxy (meth)acrylamide, N-dimethylacrylamide, and N-propylacrylamide; as a monomer having a hydroxyl group, hydroxyalkyl esters of (meth)acrylic acid such as hydroxyethyl (meth)acrylate and hydroxypropyl (meth)acrylate; and as a monomer having an epoxy group, glycidyl (meth)acrylate. The hydrophilic group-containing monomer can be used singly or in combination of two or more types.

Examples of the hydrophobic group-containing monomer and other copolymerizable monomers other than hydrophilic group-containing monomers include alkyl esters having less than 8 carbon atoms of (meth)acrylic acid such as methyl (meth)acrylate, ethyl (meth)acrylate, propyl (meth)acrylate, isopropyl (meth)acrylate, butyl (meth)acrylate, and hexyl (meth)acrylate. The hydrophobic group-containing monomer and other copolymerizable monomers other than hydrophilic group-containing monomers can be used singly or in combination of two or more types.

As the alkali-soluble resin, a bifunctional or higher functional crosslinker can be used from the viewpoint of appropriately crosslinking the resin to suppress aggregation of the pigment.

The bifunctional or higher functional crosslinker can be one having two or more reactive functional groups in the molecule to be reacted with the functional groups of the alkali-crosslinkable resin. Examples of the reactive functional groups include an epoxy group, a hydroxyl group, an isocyanate group, an amino group, and an aziridine group. The bifunctional or higher functional crosslinker can be used singly or in combination of two or more types.
<Resin Emulsion>

The resin emulsion of the present invention contains a polyurethane resin emulsion and/or a polyolefin resin emulsion.

The polyurethane resin emulsion is an emulsion in which a polyurethane resin is dispersed in water. Though any of an anionic polyurethane resin emulsion, a cationic polyurethane resin emulsion, and a nonionic polyurethane resin emulsion can be used, an anionic polyurethane resin emulsion and a nonionic polyurethane resin emulsion are preferable. Examples of the polyurethane resin include a polyether polyurethane resin, a polyester polyurethane resin, a polyester-polyether polyurethane resin, and a polycarbonate polyurethane resin. The polyurethane resin emulsion can be used singly or in combination of two or more types.

Examples of commercially available products of the polyurethane resin emulsion include "SUPERFLEX 210" (anionic polyester polyurethane resin manufactured by DKS Co. Ltd.), "SUPERFLEX 130" (anionic polyether polyurethane resin manufactured by DKS Co., Ltd.), "SUPERFLEX 500M" (nonionic polyester polyurethane resin manufactured by DKS Co., Ltd.), "SUPERFLEX 460" (anionic polycarbonate polyurethane resin manufactured by DKS Co., Ltd.), "Impranil DLP1380" (anionic polyester polyurethane resin manufactured by Sumika Covestro Urethane Co., Ltd.), "Bibond PU407" (anionic/nonionic polyester polyurethane resin manufactured by Sumika Covestro Urethane Co., Ltd.), and SUPERFLEX 420NS (anionic polycarbonate polyurethane resin manufactured by DKS Co., Ltd.).

The polyolefin resin emulsion is an emulsion in which a polyolefin resin is dispersed in water. Examples of the polyolefin resin include a polyethylene resin, a polypropylene resin, a polybutylene resin, and a polyolefin resin obtained by copolymerizing two or more of ethylene, propylene, and butylene. The polyolefin resin can be, for example, a modified polyolefin resin in which an amino group, a carboxyl group, a hydroxyl group, an acryloyl group, or other polymer chain is introduced into a polyolefin chain; an oxidized polyolefin resin in which a polyolefin chain is partially oxidized; and a halogenated polyolefin resin in which a polyolefin chain is partially halogenated. The polyolefin resin emulsion can be used singly or in combination of two or more types.

Examples of commercially available products of the polyolefin resin emulsion include "Chemipearl 5100" (Mitsui Chemicals, Inc., polyethylene resin emulsion), "Chemipearl XEP800H" (Mitsui Chemicals, Inc., polypropylene resin emulsion), and "ARROWBASE TC-4010" (UNITIKA LTD., polypropylene resin emulsion).

The resin emulsion of the present invention can contain a known resin emulsion (other resin emulsions) used in an aqueous inkjet ink composition other than the polyurethane resin emulsion and the polyolefin resin emulsion as long as the effect of the present invention is not impaired. Examples of the other resin emulsions include an acrylic resin emulsion, a styrene-acrylic resin emulsion, a polyvinyl acetate resin emulsion, and a polyvinyl chloride resin emulsion.

In the resin emulsion, the content of the polyurethane resin emulsion and/or polyolefin resin emulsion is preferably 70% by mass or more, more preferably 80% by mass or more, still more preferably 90% by mass or more, and still more preferably 95% by mass or more from the viewpoint of improving coating film resistance such as abrasion resistance.
<Surfactant>

The surfactant of the present invention contains an alkyl sulfonate and/or a polyoxyethylene alkyl ether sulfate.

The alkyl sulfonate is a higher alcohol sulfuric ester salt, and is a compound represented by General Formula (1): $R^1SO_3M$ (in Formula (1), $R^1$ is a linear or branched alkyl group or alkenyl group having 6 or more and 18 or less carbon atoms, and M is a cation.). In Formula (1) above, examples of M include ions of alkali metals such as sodium and potassium, and ammonium ions. Examples of the alkyl sulfonate include lauryl sulfate, LATEMUL PS (manufactured by Kao Corporation), SANNOL LM-1130 (manufactured by Lion Corporation), and Sandead LNM (manufactured by SANYO CHEMICAL INDUSTRIES, LTD.). The alkyl sulfonate can be used singly or in combination of two or more types.

The polyoxyethylene alkyl ether sulfate is a compound represented by General Formula (2): $R^2O(AO)_mSO_3M$ (in Formula (2), $R^2$ is a linear or branched alkyl group or alkenyl group having 6 or more and 18 or less carbon atoms, AO is a linear or branched oxyalkylene group having 2 or more and 4 or less carbon atoms, m is an average number of moles of AO added, and M is a cation.). Examples of the polyoxyethylene alkyl ether sulfate include Sandead EN (manufactured by SANYO CHEMICAL INDUSTRIES, LTD.), SANNOL LMT-1430 (manufactured by Lion Corporation), and ADEKA HOPE YES-25 (manufactured by ADEKA CORPORATION). For example, the polyoxyethylene alkyl ether sulfate can be used singly or in combination of two or more types.

The surfactant of the present invention can contain a known surfactant (other surfactants) used in an aqueous inkjet ink composition other than the alkyl sulfonate and/or the polyoxyethylene alkyl ether sulfate as long as the effect of the present invention is not impaired. Examples of the other surfactants include a nonionic surfactant, a cationic surfactant, an anionic surfactant, and a betaine surfactant. Specific examples of the other surfactants include a silicone surfactant, a fluorine surfactant, and an acetylene surfactant. The other surfactants can be used singly or in combination of two or more types.

Examples of the silicone surfactant include "BYK-307", "BYK-333", "BYK-347", "BYK-348", "BYK-349", "BYK-345", "BYK-378", and "BYK-3455" (all manufactured by BYK).

Examples of the fluorine surfactant include "F-410", "F-444", and "F-553" (all manufactured by DIC CORPORATION), and "FS-65", "FS-34", "FS-35", "FS-31", and "FS-30" (all manufactured by DuPont).

Examples of the acetylene surfactant include "Dynol 607", "Dynol 609", "Orphin E1004", "Orphin E1010", "Orphin E1020", "Orphin PD-001", "Orphin PD-002W", "Orphin PD-004", "Orphin PD-005", "Orphin EXP.4001", "Orphin EXP.4200", "Orphin EXP.4123", and "Orphin EXP.4300" (all manufactured by Nissin Chemical co., ltd.); and "SURFYNOL 104E", "SURFYNOL 104H", "SURFYNOL 104A", "SURFYNOL 104BC", "SURFYNOL 104DPM", "SURFYNOL 104PA", "SURFYNOL 104PG-50", "SURFYNOL 420", "SURFYNOL 440", and "SURFYNOL 465" (all manufactured by Evonik Industries AG).

<Water-Soluble Solvent>

As the water-soluble solvent of the present invention, a known water-soluble solvent used in an aqueous inkjet ink composition can be used without particular limitation, and examples thereof include monoalcohols, polyhydric alcohols, lower alkyl ethers of polyhydric alcohols, nitrogen-containing compounds, ketones, ethers, and esters. The water-soluble solvent can be used singly or in combination of two or more types.

Examples of the monoalcohols include methanol, ethanol, 1-propanol, 1-butanol, and 3-methoxy-3-methyl-1-butanol.

Examples of the polyhydric alcohols include ethylene glycol, propylene glycol, glycerin, diethylene glycol, 1,3-butylene glycol, 1,4-butylene glycol, 1,2-pentanediol, 1,5-pentanediol, neopentyl glycol, 1,2-hexanediol, 1,6-hexanediol, 1,2-cyclohexanediol, heptanediol, and 1,8-octanediol.

Examples of the lower alkyl ethers of polyhydric alcohols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, dipropylene glycol mono-n-propyl ether, and dipropylene glycol mono-n-butyl ether.

Examples of the nitrogen-containing compounds include pyrrolidone and N-methyl-2 pyrrolidone.

Examples of the ketones include acetone, methyl ethyl ketone, methyl butyl ketone, methyl isobutyl ketone, diisopropyl ketone, cyclopentanone, and cyclohexanone.

Examples of the ethers include isopropyl ether, n-butyl ether, tetrahydrofuran, tetrahydropyran, and 1,4-dioxane.

Examples of the esters include propylene carbonate, methyl acetate, ethyl acetate, propyl acetate, isopropyl acetate, butyl acetate, isobutyl acetate, amyl acetate, ethyl lactate, ethyl butyrate, dibutyl phthalate, and dioctyl phthalate; and cyclic esters such as ε-caprolactone and ε-caprolactam.

The water-soluble solvent preferably contains at least one type selected from the group consisting of monoalcohols, polyhydric alcohols, lower alkyl ethers of polyhydric alcohols, and nitrogen-containing compounds, and more preferably contains at least one selected from the group consisting of propylene glycol, glycerin, diethylene glycol, ethylene glycol monobutyl ether, diethylene glycol monobutyl ether, and 3-methoxy-3-methyl-1-butanol from the viewpoints of suppression of drying of the ink composition in the inkjet nozzle and ease of forming an ink layer (film) on the base material.

<Water>

The water of the present invention includes water as an aqueous medium contained in a pigment dispersion described later, water contained in the resin emulsion, and water added for adjusting the concentration of the aqueous inkjet ink composition of the present invention. Examples of the water include ion exchanged water, pure water, distilled water, and industrial water. The water can be used singly or in combination of two or more types.

Hereinafter, the percentage of each component in the aqueous inkjet ink composition of the present invention will be described.

The percentage of the pigment in the aqueous inkjet ink composition of the present invention is preferably 1% by mass or more, and more preferably 2% by mass or more from the viewpoint of improving the print density of a printed matter, and is preferably 10% by mass or less, and more preferably 8% by mass or less from the viewpoint of improving ejection stability. However, when the pigment is a white pigment, the percentage of the white pigment in the aqueous inkjet ink composition of the present invention is preferably 4% by mass or more, and more preferably 8% by mass or more, and is preferably 30% by mass or less, and more preferably 20% by mass or less.

The content of the alkali-soluble resin is preferably 5 parts by mass or more, and more preferably 15 parts by mass or more relative to 100 parts by mass of the pigment from the viewpoint of increasing the dispersibility of the pigment. The content of the alkali-soluble resin is preferably 100 parts by mass or less, more preferably 80 parts by mass or less, and still more preferably 60 parts by mass or less relative to 100 parts by mass of the pigment from the viewpoint of reducing the viscosity of the aqueous composition for ink jet printing.

The (resin) solid content of the polyurethane resin emulsion and/or polyolefin resin emulsion in the aqueous inkjet ink composition of the present invention is preferably 1% by mass or more, and preferably 3% by mass or more from the viewpoint of improving print image quality and abrasion resistance, and is preferably 10% by mass or less, and more preferably 8% by mass or less from the viewpoint of improving print image quality and storage stability.

The percentage of the alkyl sulfonate and/or the polyoxyethylene alkyl ether sulfate in the aqueous inkjet ink composition of the present invention is 0.05% by mass or more and 0.5% by mass or less. The percentage of the alkyl sulfonate and/or the polyoxyethylene alkyl ether sulfate in the aqueous inkjet ink composition of the present invention is preferably 0.1% by mass or more, more preferably 0.2% by mass or more, and preferably 0.4% by mass or less from the viewpoint of improving print image quality.

The percentage of the surfactant in the aqueous inkjet ink composition of the present invention is preferably 0.1% by mass or more, and more preferably 0.5% by mass or more from the viewpoint of improving dot expandability and solid uniformity of printed matter, and is preferably 3% by mass or less, and more preferably 2% by mass or less from the viewpoint of improving storage stability.

The percentage of the water-soluble solvent in the aqueous inkjet ink composition of the present invention is preferably 15% by mass or more, and more preferably 20% by mass or more from the viewpoint of improving the ejection stability, and is preferably 60% by mass or less, and more preferably 50% by mass or less from the viewpoint of improving the drying property of the coating film.

The percentage of the water (including water contained in each component) in the aqueous inkjet ink composition of the present invention is preferably 40% by mass or more, and more preferably 50% by mass or more from the viewpoint of improving the drying property of the coating film, and is preferably 70% by mass or less, and more preferably 60% by mass or less from the viewpoint of improving the ejection stability.

<Basic Compound>

The aqueous inkjet ink composition of the present invention preferably contains a basic compound from the viewpoint of dissolving the alkali-soluble resin. Examples of the basic compound include inorganic basic compounds such as sodium hydroxide and potassium hydroxide; and organic basic compounds such as ammonia, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine, and N-ethylmorpholine. The basic compound can be used singly or in combination of two or more types.

The percentage of the basic compound in the aqueous inkjet ink composition of the present invention can be an amount at which the alkali-soluble resin can be dissolved in a medium, is usually preferably 0.05% by mass or more, and more preferably 0.1% by mass or more from the viewpoint of increasing the dispersion stability of the alkali-soluble resin, and is preferably 1% by mass or less, and more preferably 0.5% by mass or less from the viewpoint of increasing the water resistance of a printed matter.

To the aqueous inkjet ink composition of the present invention, additives such as a known resin, a pigment dispersant, a mildewproofing agent, a rust inhibitor, a thickener, an antioxidant, an ultraviolet absorber, a preservability improver, an antifoaming agent, and a pH adjuster can be further added depending on the purpose.

<Method for Preparing Aqueous Inkjet Ink Composition>

The method for preparing (producing) the aqueous inkjet ink composition of the present invention is not particularly limited, and the above-mentioned components can be added in order or simultaneously and mixed. Examples thereof include method 1) in which an aqueous resin varnish in which an alkali-soluble resin is dissolved in water in the presence of the basic compound, a pigment, and if necessary, a pigment dispersant and the like are mixed, then a pigment dispersion (ink base) is prepared using various dispersers such as a ball mill, an attritor, a roll mill, a sand mill, and an agitator mill, and the remaining materials are further added to prepare an aqueous inkjet ink composition; and method (2) in which a pigment is dispersed by the above-mentioned method, then a resin-coated pigment in which an alkali-soluble resin is deposited on a pigment surface is obtained by, for example, an acid deposition method or an ion exchange method described in Republished patent WO 2005/116147, then the obtained resin-coated pigment is neutralized with a basic compound and redispersed in water using various dispersers (such as a high-speed stirrer), and the remaining materials are further added to prepare an aqueous ink composition for inkjet.

The aqueous inkjet ink composition of the present invention has an initial viscosity after production of 2.0 to 15.0 mPa·s, and preferably has an initial viscosity after production of 3.0 to 12.0 mPa·s. The viscosity can be measured by, for example, an E-type viscometer (trade name: RE 100 L type viscometer, manufactured by TOKI SANGYO CO., LTD).

<Primer Composition>

The primer composition of the present invention contains an aggregation accelerator that accelerates aggregation of the aqueous inkjet ink composition. As the primer composition of the present invention, for example, a colorless ink composition described in JP-A-2009-190379, a primer ink composition described in JP-6424266, and a primer ink described in JP-A-2017-88646 can be applied.

Examples of the aggregation accelerator include a water-soluble polyvalent metal salt, an organic acid, and a cationic polymer. The aggregation accelerator can be used singly or in combination of two or more types.

Examples of the water-soluble polyvalent metal salt include dissociable salts of alkaline earth metals such as Ca and Mg. Specific examples of the water-soluble polyvalent metal salt include calcium nitrate, $CaCl_2$), $Ca(OH)_2$, $(CH_3COO)_2Ca$, $MgCl_2$, $Mg(OH)_2$, $(CH_3COO)_2Mg$, $(HCOO)_2Ca$, and $MgSO_4$. Among these, calcium salts are preferable, and calcium nitrate, $CaCl_2$), $Ca(OH)_2$, $(CH_3COO)_2Ca$, and $(HCOO)_2Ca$ are preferable.

Examples of the organic acid include lactic acid, malic acid, citric acid, oxalic acid, malonic acid, acetic acid, propionic acid, and fumaric acid.

Examples of the cationic polymer include a polymer having a primary to tertiary amino group and a polymer having a quaternary ammonium base. Specific examples of the cationic polymer include a homopolymer of a monomer having a primary to tertiary amino group, a salt thereof, or a quaternary ammonium base (cationic monomer), and a copolymer or a condensation polymer of the cationic monomer and another monomer (hereinafter, referred to as a "non-cationic monomer"). The cationic polymer can be used in any form of a water-soluble polymer and water-dispersible latex particles.

The content of the aggregation accelerator is usually preferably 1% by mass or more in the primer composition from the viewpoint of improving the sharpness and smear resistance of a printed matter, and is preferably 15% by mass or less, more preferably 10% by mass or less in the primer composition from the viewpoint of improving the water resistance of a printed matter.

The primer composition of the present invention can contain a resin emulsion from the viewpoint of improving the abrasion resistance and adhesion of the primer. The resin emulsion preferably has good stability even in the presence of an aggregation accelerator, and can be used singly or in combination of two or more types.

Examples of the resin emulsion include an acrylic resin emulsion, a polyester resin emulsion, a polyurethane resin emulsion, a polyvinyl acetate resin emulsion, a polyvinyl chloride resin emulsion, a polybutadiene resin emulsion, and a polyolefin resin emulsion. Among them, an acrylic resin emulsion, a polyvinyl acetate resin emulsion, and a polyolefin resin emulsion are preferable.

Examples of the acrylic resin emulsion include an acrylic resin emulsion, a styrene-acrylic resin emulsion, an acrylic-vinyl acetate resin emulsion, an acrylic-vinyl chloride resin emulsion, an acrylic-silicone resin emulsion, and an acrylic-colloidal silica resin emulsion, and among these, a styrene-acrylic resin emulsion is preferable. The glass transition temperature of the resin contained in the acrylic resin emulsion is preferably 0° C. or less.

For the polyvinyl acetate resin emulsion, the glass transition temperature of the resin contained in the polyvinyl acetate resin emulsion is preferably 0° C. or more and 50° C. or less from the viewpoint of good adhesion to a recording medium.

The polyolefin resin emulsion is preferably a chlorinated polyolefin resin emulsion obtained by chlorinating and emulsifying a polyolefin resin. Examples of the chlorinated polyolefin resin emulsion include a chlorinated polypropylene resin emulsion and a chlorinated polyethylene resin emulsion, and the degree of chlorination is preferably 15 to 30%.

The resin solid content of the resin emulsion is usually preferably 0.5% by mass or more, and more preferably 1% by mass or more in the primer composition from the viewpoint of improving adhesion to a base material, and is preferably 10% by mass or less, and more preferably 5% by mass or less in the primer composition from the viewpoint of improving storage stability.

The primer composition of the present invention can contain a hydrazide compound to improve the adhesion between the primer and the base material by interaction with the surface of the base material. The hydrazine compound is preferably a dihydrazide compound, and examples thereof include oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, and itaconic acid dihydrazide.

The content of the hydrazide compound is usually about 0.2% by mass or more and 5% by mass or less in the primer composition.

The primer composition of the present invention can contain a surfactant from the viewpoint of improving the leveling property on the base material. As the surfactant, the same surfactant as the surfactant that can be contained in the aqueous inkjet ink composition described above can be contained.

The primer composition of the present invention can contain an optional component in addition to the components described above as necessary. Examples of the optional component include a water-soluble organic solvent and various additives. Examples of the additives include a preservability improver and an antifoaming agent.

Examples of the water-soluble organic solvent include monoalcohols, polyhydric alcohols, lower alkyl ethers of polyhydric alcohols, ketones, ethers, esters, and nitrogen-containing compounds. From the viewpoint of the drying property of the obtained primer layer, the water-soluble organic solvent is preferably not used.

Examples of the preservability improver include hindered amine, an ultraviolet absorber, and an antioxidant. Examples of the hindered amine include N—$CH_3$ type, N—H type, and N—OR type. Examples of the ultraviolet absorber include a benzophenone ultraviolet absorber, a benzotriazole ultraviolet absorber, a salicylate ultraviolet absorber, a hydroxyphenyltriazine ultraviolet absorber, a cyanoacrylate ultraviolet absorber, and a nickel complex salt ultraviolet absorber. Examples of the antioxidant include a phenol antioxidant, an amine antioxidant, a sulfur antioxidant, and a phosphorus antioxidant.

Examples of the antifoaming agent include a silicone antifoaming agent and a Pluronic antifoaming agent.

<Production of Primer Composition>

The primer composition can be produced by adding the aggregation accelerator, and if necessary, the resin emulsion, the hydrazide compound, the surfactant, the water-soluble organic solvent, and various additives to water, and stirring and mixing them with a disper or the like.

<Printed Matter>

The printed matter of the present invention is obtained by performing printing using an ink set including the aqueous inkjet ink composition and the primer composition. Specifically, the printed matter is obtained by an image formation method in which the primer composition is applied to a base material and dried to form a primer layer, and then the aqueous inkjet ink composition is printed on the primer layer using an inkjet printer. Examples of the application method of the primer composition include application methods in which various application apparatuses such as a blade coater, an air knife coater, a roll coater, a bar coater, a gravure coater, a rod blade coater, a lip coater, a curtain coater, a die coater, and an inkjet are used.

As the printing method by an inkjet method, conventionally known conditions can be appropriately adopted, and examples thereof include a method in which inkjet printing is performed by housing the primer composition (or the aqueous inkjet ink composition) in an ink cartridge, attaching the ink cartridge to an inkjet recording apparatus of, for example, a single pass system, and ejecting the primer composition (or the aqueous inkjet ink composition) from a nozzle to a base material (or primer layer).

Examples of the base material include non-absorbent print medium such as coated paper such as art paper, inkjet dedicated paper, and inkjet glossy paper, and plastic base materials such as a polyolefin film, a polyester film, a nylon film, and a polyvinyl chloride sheet; uncoated paper such as plain paper and offset paper; and a fabric of, for example, cotton, and among them, nonabsorbable printing media are preferable, and plastic base materials are more preferable from the viewpoint of good adhesion of the primer layer.

EXAMPLES

Hereinafter, the present invention will be described with reference to Examples and the like, but the present invention is not limited thereto.

Production Example 1

<Production of Pigment Dispersion (Black Ink Base)>

An alkali-soluble resin (acrylic acid/n-butyl acrylate/benzyl methacrylate/styrene copolymer), a weight average molecular weight of 30,000, an acid value of 185 mgKOH/g, a glass transition temperature of 40° C.) (20 parts by mass) was dissolved in a mixed solution of 2.5 parts by mass of potassium hydroxide and 77.5 parts by mass of water to obtain an aqueous resin varnish having a solid content of the alkali-soluble resin of 20% by mass. Then, 64.3 parts by mass of water was added to and mixed with 23.7 parts by mass of the aqueous resin varnish to prepare a resin varnish for pigment dispersion. To this resin varnish for pigment dispersion, 12 parts by mass of carbon black (trade name: "Printex 90", manufactured by Degussa AG) as a pigment was further added, and the mixture was stirred and mixed and then milled with a wet circulation mill to produce a black pigment dispersion (black ink base) of Production Example 1.

Production Examples 2 to 4

<Production of Pigment Dispersion (Yellow, Magenta, and Cyan Ink Bases)>

A yellow pigment dispersion (yellow ink base) of Production Example 2, a magenta pigment dispersion (magenta ink base) of Production Example 3, and a cyan pigment dispersion (cyan ink base) of Production Example 4 were produced in the same method as in Production Example 1 except that a yellow pigment (trade name: Novoperm Yellow 4G01, manufactured by Clariant), a magenta pigment (trade name: "Inkjet magenta E5B02", manufactured by Clariant), or a cyan pigment (trade name: Heliogen Blue L 7101 F, manufactured by BASF SE) was used instead of the carbon black (trade name: "Printex 90", manufactured by Degussa AG) described in Production Example 1.

Production Example 5

<Production of Pigment Dispersion (White Ink Base)>

Water (20.0 parts by mass) was added to and mixed with 40.0 parts by mass of the aqueous resin varnish described in Production Example 1 to prepare a resin varnish for pigment dispersion. To this resin varnish for pigment dispersion, 40 parts by mass of titanium oxide (trade name: "R-960", manufactured by DuPont) as a pigment was further added, and the mixture was stirred and mixed and then milled with a wet circulation mill to produce a white pigment dispersion (white ink base) of Production Example 5.

Example 1

<Production of Primer Composition>

Citric acid as an aggregation accelerator and an acetylene surfactant (trade name: "Orphin E1010", manufactured by Nissin Chemical co., ltd., solid content: 100%) as a surfactant were stirred and mixed in water so that the mass ratios in Table 1 would be achieved to produce a primer composition P1.

<Production of Aqueous Inkjet Ink Composition>

The black pigment dispersion liquid (black ink base), a polyester polyurethane resin 1 (trade name: "SUPERFLEX 210", manufactured by DKS Co. Ltd., anionic polyester polyurethane resin) as a polyurethane resin emulsion, sodium alkyl sulfonate (trade name: "LATEMUL PS", manufactured by Kao Corporation) as alkyl sulfonate, an acetylene surfactant (trade name: SURFYNOL 465 (solid content: 100%, HLB13, manufactured by Evonik Industries AG), propylene glycol as a water-soluble solvent, and water were stirred and mixed so that the mass ratios in Table 2 would be achieved to produce an aqueous inkjet ink composition of Example 1.

Examples 2 to 24, Comparative Examples 1 to 9

<Production of Primer Composition>

Primer compositions P2 to P10 were produced in the same method as in Example 1 except that the raw materials used and the amounts thereof were changed as shown in Table 1 in the production of the primer compositions.

<Production of Aqueous Inkjet Ink Composition>

The aqueous inkjet ink compositions for ink jet printing of Examples 2 to 24 and Comparative Examples 1 to 9 were produced in the same method as in Example 1 except that the raw materials used and the amounts thereof were changed as shown in Tables 2 to 4 in each Example and each Comparative Example.

<Evaluation of Ink Set>

Evaluation was performed by the following method, and the results are shown in Tables 2 to 4.

<Storage Stability of Ink Composition>

Each of the aqueous inkjet ink compositions for ink jet printing produced above was placed in a glass bottle, and the viscosity (mPa·s) at 25° C. was measured using a viscometer ("RE100 L type" manufactured by TOKI SANGYO CO., LTD. Then, the glass bottle was tightly stopped and stored at 60° C. for 1 month, and the viscosity (25° C.) after storage was measured with a viscometer. The storage stability was evaluated by the rate of viscosity change (60° C., (viscosity after 1 month−viscosity before storage)/viscosity before storage).

[Evaluation Criteria of Storage Stability]

○: Rate of viscosity change of less than 5%

Δ: Rate of viscosity change of 5% or more and less than 10% x: Rate of viscosity change of 10% or more

<Ejection Stability of Ink Composition>

The aqueous inkjet ink composition produced above was packed in a cartridge of an inkjet printer ("PX105", manufactured by Seiko Epson Corp.), printing was performed on photo paper ("GL-101A450", manufactured by Canon Inc.), and ejection stability was evaluated.

[Evaluation Criteria of Ejection Stability]

○: There is almost no printing disorder and ejection can be stably performed.

Δ: There is some printing disorder, but ejection can be performed.

x: There is printing disorder, and ejection cannot be stably performed.

<Print Image Quality of Ink Composition>

<Solid Filling>

The aqueous inkjet ink composition produced above was packed in a cartridge of an ink jet printer ("PX 105", manufactured by Seiko Epson Corp.), solid printing was performed on coated paper ("OK Top Coat", manufactured by Oji Paper Co., Ltd.) on which the primer composition produced above was spread using a 0.1 mm bar coater, and streaks and white spots were visually evaluated for the formability of the solid printing.
[Evaluation Criteria]
  ○: No streaks or white spots
  Δ: Some streaks and white spots
  x: Many streaks and white spots
<Smearing>
The aqueous inkjet ink composition produced above was packed in a cartridge of an ink jet printer ("PX 105", manufactured by Seiko Epson Corp.), a thin line of about 0.3 mm was printed on coated paper ("OK Top Coat", manufactured by Oji Paper Co., Ltd.) on which the primer composition produced above was spread using a 0.1 mm bar coater, and thickening due to smearing was visually observed for evaluation.
[Evaluation Criteria]
  ○: No smearing or change in thickness on the printed matter
  Δ: Partial thickening was observed, but thickening of twice or more was not observed on the printed matter
  x: Thickening of twice or more was not observed on the printed matter
<Abrasion Resistance>
The aqueous inkjet ink composition produced above was packed in a cartridge of an ink jet printer ("PX 105", manufactured by Seiko Epson Corp.), solid printing was performed on coated paper ("OK Top Coat", manufactured by Oji Paper Co., Ltd.) on which the primer composition produced above was spread using a 0.1 mm bar coater, and the state of the printed matter after 50 rubs at a load of 200 g by a Gakushin type friction resistance tester with coated paper being applied was observed and evaluated based on the following criteria.
[Evaluation Criteria]
  ○: Printing is not blurred
  Δ: Printing is slightly blurred, but letters can be clearly read
  x: Printing is blurred and letters cannot be read P-105 represents a quaternary ammonium salt polymer (trade name: "Papiogen P105", manufactured by SENKA corporation);

the chlorinated polyolefin resin emulsion represents a chlorinated polyolefin resin emulsion (trade name: SUPERCHLON E-604, manufactured by NIPPON PAPER INDUSTRIES CO., LTD., degree of chlorination: 21%);

the acrylic resin emulsion represents an acrylic resin emulsion (trade name: "VINYBLAN 2687", manufactured by Nissin Chemical co., ltd.);

the polyvinyl acetate resin emulsion represents a polyvinyl acetate resin emulsion (trade name: "VINYBLAN 1129", manufactured by Nissin Chemical co., ltd.);

the styrene-acrylic resin emulsion represents (trade name: NeoCryl XK-88, manufactured by DSM Neoresin); and Orphin E1010 represents an acetylene surfactant (trade name: "Orphin E1010", manufactured by Nissin Chemical co., ltd., solid content: 100%).

TABLE 1

|  |  | Primer composition | | | | | | | | | |
| --- | --- | --- | --- | --- | --- | --- | --- | --- | --- | --- | --- |
|  |  | P1 | P2 | P3 | P4 | P5 | P6 | P7 | P8 | P9 | P10 |
| Aggregation accelerator (Solid content) | Citric acid | 15 | 10 | — | — | — | — | — | — | — | — |
|  | Calcium acetate | — | — | 2 | 2 | 2 | 2 | — | — | — | — |
|  | Calcium nitrate | — | — | — | — | — | — | 10 | — | — | — |
|  | Calcium chloride | — | — | — | — | — | — | — | 5 | — | 5 |
|  | P-105 | — | — | — | — | — | — | — | — | 3 | — |
| Resin emulsion (Solid content) | Chlorinated polyolefin resin emulsion | — | — | 2 | — | — | — | — | — | — | — |
|  | Acrylic resin emulsion | — | — | — | 2 | — | — | — | — | — | — |
|  | Polyvinyl acetate resin emulsion | — | — | — | — | 2 | — | — | — | — | — |
|  | Styrene-acrylic resin emulsion | — | — | — | — | — | — | 5 | 5 | — | 5 |
| Hydrazide compound | Dihydrazide adipate | — | — | — | — | — | 2 | — | — | — | — |
| Water-soluble organic solvent | Diethylene glycol | — | — | — | — | — | — | — | — | — | 10 |
|  | Water (including water of resin emulsion) | 84.5 | 89.5 | 95.5 | 95.5 | 95.5 | 95.5 | 84.5 | 89.5 | 96.5 | 79.5 |
| Surfactant | Orphin E1010 | 0.5 | 0.5 | 0.5 | 0.5 | 0.5 | 0.5 | 0.5 | 0.5 | 0.5 | 0.5 |
|  | Total | 100 | 100 | 100 | 100 | 100 | 100 | 100 | 100 | 100 | 100 |

In Table 1,

TABLE 2

| | | | | Examples | | | | | | | | | | | | |
|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 |
| Aqueous inkjet ink composition | Pigment dispersant (Ink base) | Production Example 1 | Black ink base | 34 | — | — | — | — | 34 | 34 | 34 | 34 | 34 | 34 | 34 | 34 |
| | | Production Example 2 | Yellow ink base | — | 34 | — | — | — | — | — | — | — | — | — | — | — |
| | | Production Example 3 | Magenta ink base | — | — | 34 | — | — | — | — | — | — | — | — | — | — |
| | | Production Example 4 | Cyan ink Base | — | — | — | 25 | — | — | — | — | — | — | — | — | — |
| | | Production Example 5 | White ink base | — | — | — | — | 25 | — | — | — | — | — | — | — | — |
| | Polyurethane resin emulsion (Solid conent) | Polyester polyurethane resin 1 | | 5 | 5 | 5 | 5 | 5 | 1 | 10 | 5 | 5 | 5 | 5 | 5 | 5 |
| | | Polyerster polyurethane resin 2 | | — | — | — | — | — | — | — | — | — | — | — | — | — |
| | | Polyether polyurethane resin | | — | — | — | — | — | — | — | — | — | — | — | — | — |
| | | Polycarbonate polyurethane resin | | — | — | — | — | — | — | — | — | — | — | — | — | — |
| | Polyolein resin emulsion (Solid content) | Polyethylene resin emulsion | | — | — | — | — | — | — | — | — | — | — | — | — | — |
| | | Polypropylene resin emulsion | | — | — | — | — | — | — | — | — | — | — | — | — | — |
| | Other resin emulsion (Solid Content) | Acrylic resin emulsion | | — | — | — | — | — | — | — | — | — | — | — | — | — |
| | | Acrylic-styrene resin emulsion | | — | — | — | — | — | — | — | — | — | — | — | — | — |
| | | Acrylic-vinyl acetate resin emulsion | | — | — | — | — | — | — | — | — | — | — | — | — | — |
| | Surfactant (Solid content) | Alkyl sulfonate | | 0.3 | 0.3 | 0.3 | 0.3 | 0.3 | 0.3 | 0.3 | 0.1 | 0.5 | — | 0.3 | 0.3 | 0.3 |
| | | Polyoxyethylene alkyl ether sulfate | | — | — | — | — | — | — | — | — | — | 0.3 | — | — | — |
| | | Alkylbenzenesulfonate | | — | — | — | — | — | — | — | — | — | — | — | — | — |
| | | Alkyl carboxylate | | — | — | — | — | — | — | — | — | — | — | — | — | — |
| | | Acetylene surfactant | | 1 | 1 | 1 | 1 | 1 | 1 | 1 | 1 | 1 | 1 | 1 | 1 | 1 |
| | | Propylene glycol | | 35 | 35 | 35 | 37 | 28 | 40 | 30 | 35 | 35 | 35 | 35 | 35 | 35 |
| | | Water (included water of resin emulsion and surfactant) | | 24.7 | 24.7 | 24.7 | 31.7 | 40.7 | 23.7 | 24.7 | 24.9 | 24.5 | 24.7 | 24.7 | 24.7 | 24.7 |
| | | Total | | 100 | 100 | 100 | 100 | 100 | 100 | 100 | 100 | 100 | 100 | 100 | 100 | 100 |
| | | Primer composition | | P1 | P1 | P1 | P1 | P1 | P1 | P1 | P1 | P1 | P1 | P2 | P3 | P4 |
| Evaluation results | Strage stability | | Numberical value (%) | 3.2 | 2.5 | 3.0 | 2.0 | 2.0 | 1.8 | 6.5 | 3.7 | 4.0 | 6.8 | 3.2 | 3.2 | 3.2 |
| | | | Evaluation | ○ | ○ | ○ | ○ | ○ | ○ | Δ | ○ | ○ | Δ | ○ | ○ | ○ |
| | Ejection staility | | Evaluation | ○ | ○ | ○ | ○ | ○ | ○ | ○ | ○ | ○ | ○ | ○ | ○ | ○ |
| | Print image quality | Solid filling | Evaluation | ○ | ○ | ○ | ○ | ○ | ○ | Δ | Δ | ○ | ○ | ○ | ○ | ○ |
| | | Smearing | Evaluation | ○ | ○ | ○ | ○ | ○ | Δ | ○ | ○ | Δ | Δ | ○ | ○ | ○ |
| | Abrasion resistance | | Evaluation | ○ | ○ | ○ | ○ | ○ | Δ | ○ | ○ | ○ | ○ | ○ | ○ | ○ |

TABLE 3

| | | | | Examples | | | | | | | | | | |
|---|---|---|---|---|---|---|---|---|---|---|---|---|---|---|
| | | | | 14 | 15 | 16 | 17 | 18 | 19 | 20 | 21 | 22 | 23 | 24 |
| Aqueous inkjet ink composition | Pigment dispersant (Ink base) | Production Example 1 | Black ink base | 34 | 34 | 34 | 34 | 34 | 34 | 34 | 34 | 34 | 34 | 34 |
| | | Production Example 2 | Yellow ink base | — | — | — | — | — | — | — | — | — | — | — |
| | | Production Example 3 | Magenta ink base | — | — | — | — | — | — | — | — | — | — | — |
| | | Production Example 4 | Cyan ink Base | — | — | — | — | — | — | — | — | — | — | — |
| | | Production Example 5 | White ink base | — | — | — | — | — | — | — | — | — | — | — |
| | Polyurethane resin emulsion (Solid conent) | Polyester polyurethane resin 1 | | 5 | 5 | 5 | 5 | 5 | 5 | — | — | — | — | — |
| | | Polyerster polyurethane resin 2 | | — | — | — | — | — | — | 5 | — | — | — | — |
| | | Polyether polyurethane resin | | — | — | — | — | — | — | — | 5 | — | — | — |

TABLE 3-continued

| | | | Examples | | | | | | | | | | | |
|---|---|---|---|---|---|---|---|---|---|---|---|---|---|---|
| | | | 14 | 15 | 16 | 17 | 18 | 19 | 20 | 21 | 22 | 23 | 24 |
| | | Polycarbonate polyurethane resin | — | — | — | — | — | — | — | — | 5 | — | — |
| Polyolein resin emulsion (Solid content) | | Polyethylene resin emulsion | — | — | — | — | — | — | — | — | — | 5 | — |
| | | Polypropylene resin emulsion | — | — | — | — | — | — | — | — | — | — | 5 |
| Other resin emulsion (Solid Content) | | Acrylic resin emulsion | — | — | — | — | — | — | — | — | — | — | — |
| | | Acrylic-styrene resin emulsion | — | — | — | — | — | — | — | — | — | — | — |
| | | Acrylic-vinyl acetate resin emulsion | — | — | — | — | — | — | — | — | — | — | — |
| Surfactant (Solid content) | | Alkyl sulfonate | 0.3 | 0.3 | 0.3 | 0.3 | 0.3 | 0.3 | 0.3 | 0.3 | 0.3 | 0.3 | 0.3 |
| | | Polyoxyethylene alkyl ether sulfate | — | — | — | — | — | — | — | — | — | — | — |
| | | Alkylbenzenesulfonate | — | — | — | — | — | — | — | — | — | — | — |
| | | Alkyl carboxylate | — | — | — | — | — | — | — | — | — | — | — |
| | | Acetylene surfactant | 1 | 1 | 1 | 1 | 1 | 1 | 1 | 1 | 1 | 1 | 1 |
| | | Propylene glycol | 35 | 35 | 35 | 35 | 35 | 35 | 35 | 35 | 35 | 35 | 35 |
| | | Water (included water of resin emulsion and surfactant) | 24.7 | 24.7 | 24.7 | 24.7 | 24.7 | 24.7 | 24.7 | 24.7 | 24.7 | 24.7 | 24.7 |
| | | Total | 100 | 100 | 100 | 100 | 100 | 100 | 100 | 100 | 100 | 100 | 100 |
| | | Primer composition | P5 | P6 | P7 | P8 | P9 | P10 | P1 | P1 | P1 | P1 | P1 |
| Evaluation results | Strage stability | Numerical value (%) | 3.2 | 3.2 | 3.2 | 3.2 | 3.2 | 3.2 | 3.1 | 5.2 | 4.0 | 2.4 | 3.8 |
| | | Evaluation | ○ | ○ | ○ | ○ | ○ | ○ | ○ | ○ | ○ | ○ | ○ |
| | Ejection staility | Evaluation | ○ | ○ | ○ | ○ | ○ | ○ | ○ | ○ | ○ | ○ | ○ |
| | Print image quality | Solid filling Evaluation | ○ | ○ | ○ | ○ | ○ | ○ | ○ | ○ | ○ | ○ | ○ |
| | | Smearing Evaluation | ○ | ○ | ○ | ○ | ○ | ○ | ○ | ○ | ○ | ○ | ○ |
| | Abrasion resistance | Evaluation | ○ | ○ | ○ | ○ | ○ | ○ | ○ | ○ | ○ | ○ | ○ |

TABLE 4

| | | | | Comparative Examples | | | | | | | | |
|---|---|---|---|---|---|---|---|---|---|---|---|---|
| | | | | 1 | 2 | 3 | 4 | 5 | 6 | 7 | 8 | 9 |
| Aqueous inkjet ink composition | Pigment dispersant (Ink base) | Production Example 1 | Black ink base | 34 | 34 | 34 | 34 | 34 | 34 | 34 | 34 | 34 |
| | | Production Example 2 | Yellow ink base | — | — | — | — | — | — | — | — | — |
| | | Production Example 3 | Magenta ink base | — | — | — | — | — | — | — | — | — |
| | | Production Example 4 | Cyan ink Base | — | — | — | — | — | — | — | — | — |
| | | Production Example 5 | White ink base | — | — | — | — | — | — | — | — | — |
| | Polyurethane resin emulsion (Solid conent) | Polyester polyurethane resin 1 | | 5 | — | 5 | 5 | — | — | — | 5 | 5 |
| | | Polyerster polyurethane resin 2 | | — | — | — | — | — | — | — | — | — |
| | | Polyether polyurethane resin | | — | — | — | — | — | — | — | — | — |
| | | Polycarbonate polyurethane resin | | — | — | — | — | — | — | — | — | — |
| | Polyolein resin emulsion (Solid content) | Polyethylene resin emulsion | | — | — | — | — | — | — | — | — | — |
| | | Polypropylene resin emulsion | | — | — | — | — | — | — | — | — | — |
| | Other resin emulsion (Solid Content) | Acrylic resin emulsion | | — | — | — | — | 5 | — | — | — | — |
| | | Acrylic-styrene resin emulsion | | — | — | — | — | — | 5 | — | — | — |
| | | Acrylic-vinyl acetate resin emulsion | | — | — | — | — | — | — | 5 | — | — |
| | Surfactant (Solid content) | Alkyl sulfonate | | 0.3 | 0.3 | — | 1 | 0.3 | 0.3 | 0.3 | — | — |
| | | Polyoxyethylene alkyl ether sulfate | | — | — | — | — | — | — | — | — | — |
| | | Alkylbenzenesulfonate | | — | — | — | — | — | — | — | 0.3 | — |
| | | Alkyl carboxylate | | — | — | — | — | — | — | — | — | 0.3 |
| | | Acetylene surfactant | | 1 | 1 | 1 | 1 | 1 | 1 | 1 | 1 | 1 |
| | | Propylene glycol | | 35 | 40 | 35 | 35 | 35 | 35 | 35 | 35 | 35 |
| | | Water (included water of resin emulsion and surfactant) | | 24.7 | 24.7 | 25 | 24 | 24.7 | 24.7 | 24.7 | 24.7 | 24.7 |
| | | Total | | 100 | 100 | 100 | 100 | 100 | 100 | 100 | 100 | 100 |
| | | Primer composition | | — | P1 | P1 | P1 | P1 | P1 | P1 | P1 | P1 |
| Evaluation results | Strage stability | Numerical value (%) | | 1.8 | 1.8 | 3.3 | 3.3 | 3.4 | 3.5 | 3.9 | 3.2 | 3.2 |
| | | Evaluation | | ○ | ○ | ○ | ○ | ○ | ○ | ○ | ○ | ○ |
| | Ejection staility | Evaluation | | ○ | ○ | ○ | ○ | ○ | ○ | ○ | ○ | ○ |
| | Print image quality | Solid filling Evaluation | | ○ | ○ | x | ○ | ○ | ○ | ○ | x | x |
| | | Smearing Evaluation | | x | x | ○ | x | x | x | x | ○ | ○ |
| | Abrasion resistance | Evaluation | | ○ | x | ○ | ○ | Δ | ○ | Δ | ○ | ○ |

In Table 2 to 4, for the resin emulsions, the polyester polyurethane resin emulsion 1 represents an anionic polyester polyurethane resin emulsion (trade name: "SUPERFLEX 210", manufactured by DKS Co. Ltd.);

the polyester polyurethane resin emulsion 2 represents a nonionic polyester polyurethane resin emulsion (trade name: "SUPERFLEX 500 M", manufactured by DKS Co. Ltd.);

the polyether polyurethane resin emulsion represents an anionic polyether polyurethane resin emulsion (trade name: "SUPERFLEX 130", manufactured by DKS Co. Ltd.);

the polycarbonate polyurethane resin emulsion represents an anionic polycarbonate polyurethane resin emulsion (trade name: "SUPERFLEX 460", manufactured by DKS Co. Ltd.).

the polyethylene resin emulsion represents a polyethylene resin emulsion (trade name: Chemipearl S100, manufactured by Mitsui Chemicals, Inc.);

the polypropylene resin emulsion represents a polypropylene resin emulsion (trade name: Chemipearl XEP800H, manufactured by Mitsui Chemicals, Inc.);

the acrylic resin emulsion represents an acrylic resin emulsion (trade name: Yodozol AD173, manufactured by Henkel Japan Ltd.);

the acrylic-styrene resin emulsion represents an acrylic-styrene resin emulsion (trade name: Yodozol AD199, manufactured by Henkel Japan Ltd.); and the acrylic-vinyl acetate resin emulsion represents an acrylic-vinyl acetate resin emulsion (trade name: "VINYBLAN 1245L", manufactured by Nissin Chemical co., ltd.).

In Table 2 to 4, for the surfactants, the alkyl sulfonate represents sodium alkyl sulfonate (trade name: "LATEMUL PS", manufactured by Kao Corporation);

the polyoxyethylene alkyl ether sulfate represents sodium polyoxyethylene alkyl ether sulfate (trade name: "Sandead EN", manufactured by SANYO CHEMICAL INDUSTRIES, LTD.);

the alkylbenzene sulfonate represents an alkylbenzene sulfonate (trade name: "LIPON LH-200", manufactured by Lion Corporation);

the alkyl carboxylate represents an alkyl carboxylate (trade name: "FR-25", manufactured by Kao Corporation); and the acetylene surfactant represents an acetylene surfactant (trade name "SURFYNOL 465" (solid content: 100%, HLB13, manufactured by Evonik Industries AG).

The invention claimed is:

1. An ink set comprising:
    an aqueous inkjet ink composition; and
    a primer composition,
    wherein the aqueous inkjet ink composition contains a pigment, an alkali-soluble resin which is an acrylic copolymer resin, a resin emulsion, a surfactant, a water-soluble solvent, and water, the resin emulsion contains a polyurethane resin emulsion and/or a polyolefin resin emulsion, the surfactant contains an alkyl sulfonate and/or a polyoxyethylene alkyl ether sulfate, the aqueous inkjet ink composition has a content of the alkyl sulfonate and/or the polyoxyethylene alkyl ether sulfate of 0.05% by mass or more and 0.5% by mass or less, and the primer composition contains an aggregation accelerator that accelerates aggregation of the aqueous inkjet ink composition.

2. The ink set according to claim 1, wherein the aqueous inkjet ink composition has a solid content of the polyurethane resin emulsion and/or the polyolefin resin emulsion of 1% by mass or more and 10% by mass or less.

3. A printed matter obtained by performing printing using the ink set according to claim 1.

4. An image formation method using the ink set according to claim 1.

* * * * *